Jan. 14, 1964   R. PAILLET   3,117,670
APPARATUS FOR GAUGING FRUIT AND THE LIKE ARTICLES
Filed Nov. 24, 1961   2 Sheets-Sheet 2

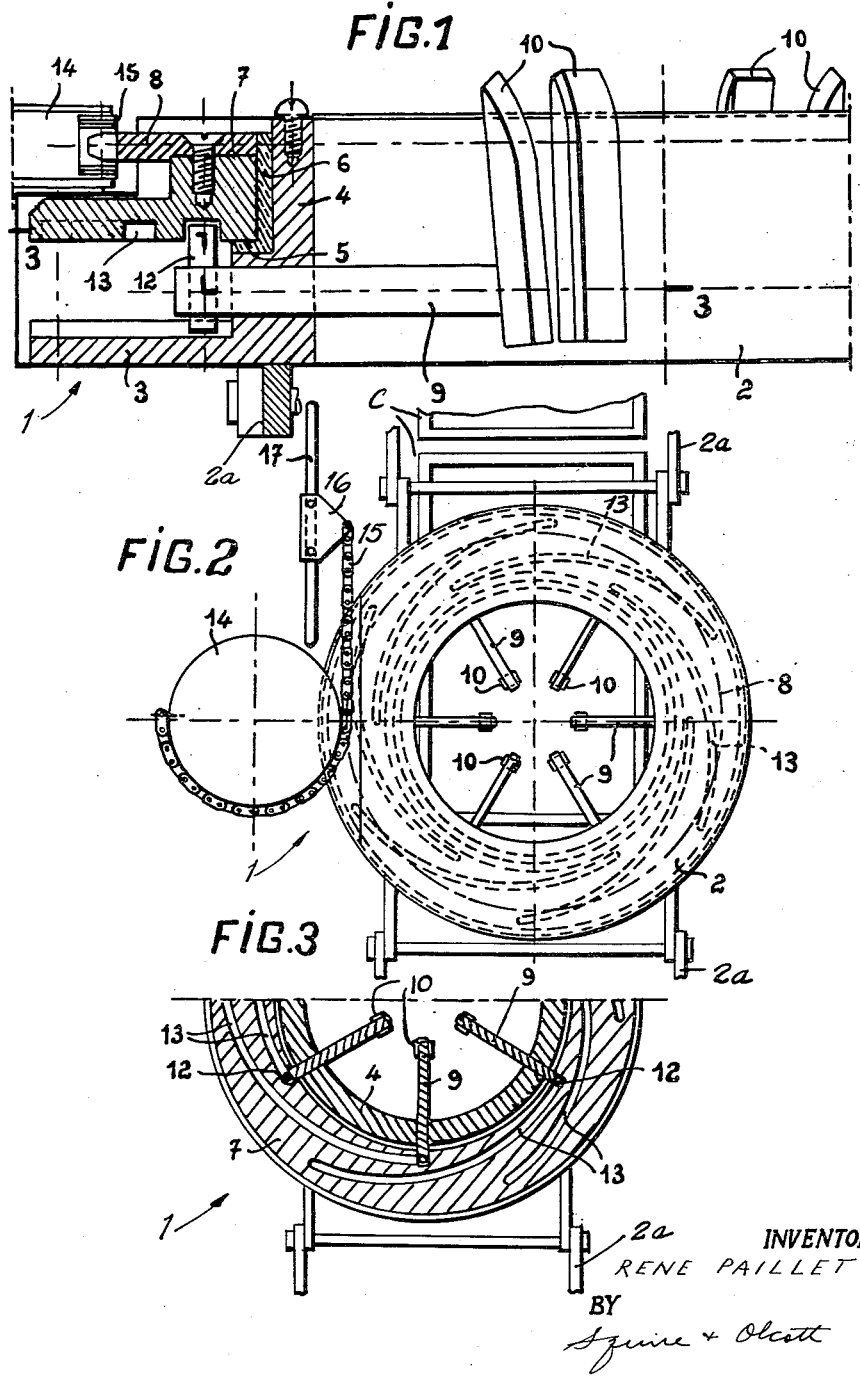

INVENTOR:
RENÉ PAILLET
BY
Squire + Olcott
ATTYS.

United States Patent Office 3,117,670
Patented Jan. 14, 1964

1

3,117,670
APPARATUS FOR GAUGING FRUIT AND THE
LIKE ARTICLES
René Paillet, 69bis Ave. du 25eme R.T.S., Lyon, France
Filed Nov. 24, 1961, Ser. No. 154,659
Claims priority, application France Nov. 29, 1960
4 Claims. (Cl. 209—83)

This invention concerns a machine for gauging fruits or other small articles of different sizes.

Machines adapted for gauging of fruit or the like articles generally include an endless conveyor moving continuously over containers each of which receives fruit of a predetermined size. The endless conveyor carries gauging members adapted to hold fruits and to release them when they reach positions above the containers provided for the predetermined gauged sizes.

This invention has for its particular object a gauging member which moves with the endless conveyor of a gauging machine. The gauging member includes a hollow cylinder through which extends radially shiftable elongated projections defining an inverted frusto-conical cage adapted to receive a fruit. The cylinder has an annular ring at its hollow end, the lower surface of which is provided with arcuate grooves eccentric with reference to the axis of the gauging member. The number of grooves is equal to that of the above-mentioned projections. The projections carry studs, rollers or the like parts each engaging in a corresponding groove. The cylinder is associated with means which produce, during the translational movement of the gauging member, a predetermined angular shifting of the ring and thereby a predetermined radial movement of the fruit-holding projections.

In a preferred embodiment of my improved gauging apparatus, the cylinder carries a pinion gear having an outer series of teeth which engage, during the translational movement of the gauging member, a lateral stationary chain, of which one end is secured to a stationary drum. The angular position of the drum is adjustable. The other end of the chain engages a stationary support, the position of which is adjustable along a stationary slideway. The chain can be varied in length by resetting the angular position of the drum and the position of the support on the slideway.

According to a modification of the gauging apparatus, the grooved ring is controlled by a system of two levers pivotally secured together and of which one is pivotally secured to the ring, while the other is pivotally secured to the gauging member. During the translational movement of the gauging member, the one lever engages inclined plates, cams or the like parts, which produce an angular shifting of the lever in either direction. This causes a corresponding angular shifting of the grooved ring and, consequently, a radial inward or outward shifting of the elongated cage-forming projections in either direction.

The frusto-conical gauging cage may be constituted by an upper ring made of elastic material, provided with extensions also made of elastic material defining the periphery of the frusto-cone, while the lower ends of the extensions may be fitted inside recesses formed at the ends of rods radially shiftable in openings of the gauging member.

Two embodiments of the gauging apparatus embodying the invention are shown in the accompanying drawings, wherein:

FIG. 1 is a fragmentary, partly sectional, partly internal elevational view and partly external elevational view of a first embodiment.

FIG. 2 is a top plan view on a reduced scale of the apparatus of FIG. 1.

2

FIG. 3 is a partial horizontal cross-section taken on line 3—3 of FIG. 1.

Figure 4:
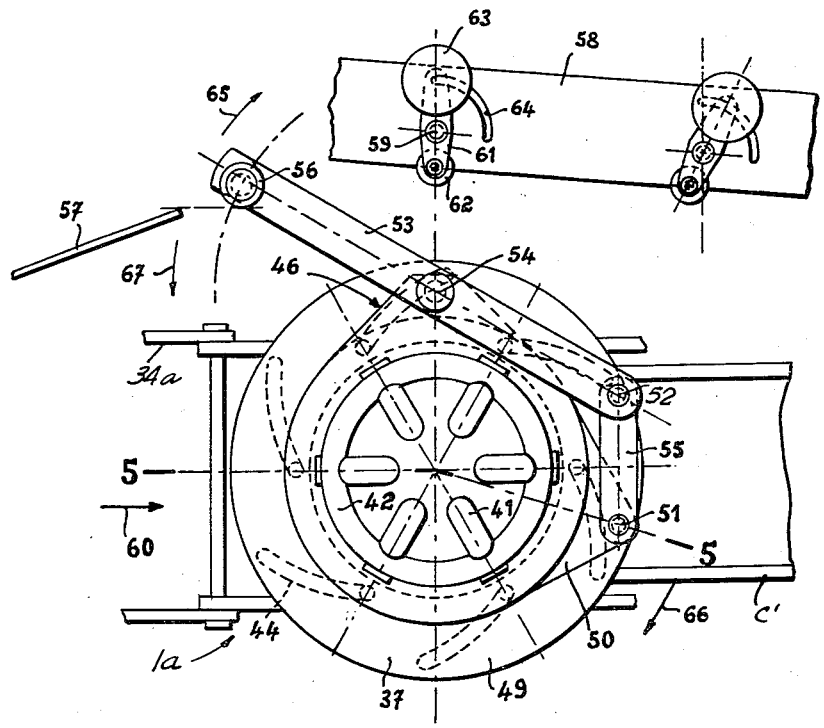

FIG. 4 is a top plan view of part of another apparatus constituting another embodiment of the invention.

Figure 5:
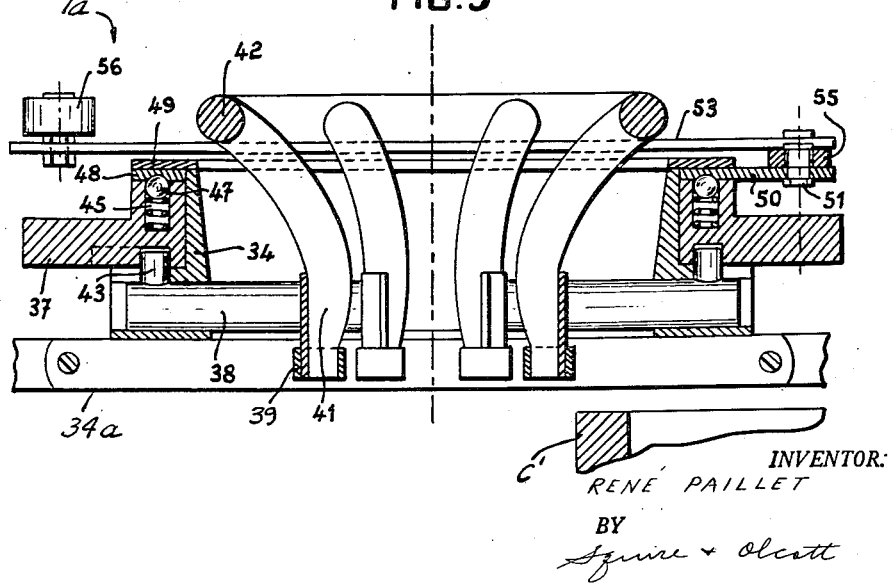

FIG. 5 is an enlarged sectional view taken on line 5—5 of FIG. 4.

Referring to the apparatus illustrated in FIGS. 1 to 3, gauging member 1 includes a cylindrical casing 2 carried by a chain 2a or other endless conveyor means provided in the gauging apparatus. This casing 2 includes an annulus or ring 3 and an upper cylindrical flange 4. The flange is provided with an outer shoulder 5 serving as a support for the lower end of a sleeve 6. Around the sleeve is fitted a ring 7 which rotates freely around flange 4. Over ring 7 is screwed a pinion 8, which rotates in unison with ring 7.

Through the lower section of the flange 4, there pass radial rods 9 terminating at one of their ends which lies inside the annular body in elongated projections 10. The projections define an inverted frusto-conical cage.

At their outer ends, the rods 9 carry each a small abutment 12 or a roller engaging in a groove 13 formed in the lower surface of the ring 7. This lower surface of the ring 7 is provided with a number of grooves 13 equal to the number of rods 9 and of the projections 10. The grooves 13 are defined by arcuate lines eccentric with reference to the axis of the gauging member 1 or with reference to the axis of the annulus or ring 3.

Containers C are disposed in a row under the chain which carries a plurality of gauging members 1. Near each container which receives fruit of a predetermined size, there is positioned a stationary drum 14, the angular position of which is adjustable. The drum 14 is engaged by one end of a short chain 15, of which the other end is anchored to a support 16 held fast inside a slideway 17 (FIG. 2). The chain 15 engages the teeth of the pinions 8 on the successive gauging members 1.

The operation of the gauging apparatus is as follows: When the gauging member 1 carried by chain 2a or other endless conveyor, reaches a starting point on the machine, the projections 10 are urged to a maximum extent inwardly and towards one another, so as to define a frusto-conical cage of a minimum cross-section as shown in FIGS. 1–3. The abutments 12 or rollers carried by the outer ends of the rods 9 are then located at the innermost point of the corresponding groove 13.

A fruit may then be introduced into the cage which is in a condition of minimum cross-section. The endless chain 2a moves continuously, and the casing 2 of the gauging member 1 passes in succession over the containers C which receive fruit of various sizes. At the moment at which a gauging member 1 passes over any one of containers C, the ring 7 is shifted by a predetermined fraction of a revolution, so that the rods 9 and, consequently, the projections 10 are subjected to a radial shifting inside the annulus 3 by a predetermined extent.

As the gauging member 1 passes over each container, pinion 8 engages the short chain 15 positioned at the container and this results in an angular movement of the pinion 8, and, consequently, of the ring 7 around the annulus 3 of the gauging member. This angular movement results in its turn in a radial shifting of the rods 9 and, consequently, of the projections 10. The cross-section of the gauging cage defined by the elongated inner projections 10, increases, since the outer abutments 12 or rollers, on the rods 9, are then shifted away from the innermost ends of the grooves 13 towards the outermost ends of the grooves.

In order to adjust the extent of opening of the cage defined by the projections 10, the length of the section of the chain 15 with which the pinions 8 are to mesh can be adjusted. This adjustment is made by turning the drum 14 on its axis through a predetermined fraction of a revolution, while the support 16 is shifted by a corresponding amount along the stationary slideway 17. Then both the drum and support 16 are fixed in position so that the chain is stationary.

The adjustment of the chain 15 allows a fruit of a predetermined size to be dropped into a corresponding container C. The fruit positioned in the cage defined by the projections 10, drops into a container as soon as the cross-section of the cage increases, under the action of the adjacent chain 15, to a size larger than the size of the fruit carried by it.

It should be noted that the projections 10 carried by the rods 9 are preferably removable, so as to allow fitting extensions on the inner ends of the rods 9. It is thus possible to use the same gauging member 1 for fruit of very different size ranges.

In the apparatus illustrated in FIGS. 4 and 5, gauging member 1a includes a hollow casing 34 carried by chain 34a or other endless conveyor. Radial rods or projections 38 extend through casing 34. The grooves 44 of ring 37 on casing 34 are engaged by the studs 43 at the outer ends of projections 38.

Each of the projections 38 terminates inwardly with a carrier 39 fitted in which is the lower end of a rubber rod 41. The upper end of the rod is integral with a rubber ring 42. The rods 41 and ring 42 define a frusto-conical cage of the gauging member 1a.

An annulus or ring 49 urges over the grooved ring 37 a second annulus 48 provided with an outer lug 50.

The upper surface of the ring 37 is provided with four blind bores 45 each carrying a spring urging upwardly a ball 47. The lower surface of the annulus 48 is provided with a plurality of depressions in the shape of spherical caps, four of which serve selectively as bearings for the balls 47. The ring 37 and the annulus 48 are thus frictionally connected, so as to rotate in unison.

The lug 50 of annulus 48 carries the pivot 51 for a link 55 pivotally secured at 52 to one of the ends of a further lever 53 rockably carried by a stud 54 fitted on a lug 46 formed on the upper annulus 49. At its other end, the lever 53 carries a roller 56.

The stationary part of the apparatus includes, ahead of the containers C′, an inclined plate 57 which acts on the levers for closing cage 41, 42 to a minimum cross-section. A bar 58 serves as a carrier for studs 59 to which are pivotally secured levers 61 each located at one container C′. The levers each carry at their outer end a selecting cam 62 and at their inner end a knurled knob 63 which serves to secure the end of the lever 61 to any point of the corresponding arcuate groove 64 provided for this purpose in the bar 58. This allows shifting the cam 62 more or less out of the path followed by the gauging member.

Thus, during the progression of each gauging member 1a in the direction of the arrow 60 of FIG. 4, the roller 56 moves away from the plate 57 which, by reason of its angular setting, has caused the lever 53 to rock in the direction of the arrow 65 and resulted in a rotation of the annulus 48 around the casing 34 in the direction of the arrow 66. Consequently, the projections 38 are shifted to a maximum extent towards the center of the gauging member 1a. The gauging member is then in a condition of minimum cross-section.

The gauging member 1a continues its progress in the direction of the arrow 60. The roller 56 meets the cams 62, which produces successive rocking movements of the lever 53 in the direction of the arrow 67. This leads to a succession of retraction movements of the projections 38. The extent of the retraction movements is adjustable by suitable positioning of the levers 61 to permit the desired gauging operation.

What I claim is:

1. In a machine for gauging fruit and the like articles including a plurality of containers to receive articles of different sizes, the combination comprising: an endless driven conveyor extending over said containers, at least one gauging member carried by said conveyor, said member including a casing secured to said conveyor, said casing having a cylindrical wall and slots extending through said wall, a series of rods extending slidingly through said slots, projections secured to inner ends of said rods and forming together an upwardly flaring cage to support an article to be gauged, a ring frictionally and coaxially fitted around said casing and provided with arcuate grooves eccentric with reference to the ring, each groove engaging the outer end of a corresponding rod, the rotation of the ring controlling simultaneously through the action of its grooves on the rods, the radial position of said rods and projections to define the size of the cage, and stationary means located at one of the containers for angularly shifting the ring of the gauging member carried along by the conveyor to urge the projections outwardly by predetermined amounts to open the cage to a size large enough to allow an article to drop out of the cage and into said one container.

2. In a machine for gauging fruit and the like articles including a plurality of containers to receive articles of different sizes, the combination comprising: an endless driven conveyor extending over said containers, a gauging member carried by said conveyor, said member including a casing secured to said conveyor, said casing having a cylindrical wall and slots extending through said wall, a series of rods extending slidingly through said slots, projections secured to inner ends of said rods and forming together an upwardly flaring cage to support an article to be gauged, a ring frictionally and coaxially fitted around said casing and provided with arcuate grooves eccentric with reference to the ring, each groove engaging the outer end of a corresponding rod, the rotation of the ring controlling simultaneously through the action of its grooves on the rods, the radial positions of said rods and projections to define the size of the cage, a series of teeth rigid with the outer periphery of the ring, an angularly shiftable drum located in a stationary position at one of the containers, a short chain secured at one end thereof to the drum, and normally stationary means anchoring the other end of said chain, said chain extending alongside the path of gauging member to engage the teeth and to turn the ring so that the projections controlled by the ring are urged outwardly, said normally stationary means being adjustable along with the angular setting of the drum to modify the operative length of said chain and thereby to adjust the extent of opening of the cage to such a size as will allow the fruit of said size carried in the cage to drop out of the latter into said one container.

3. In a machine for gauging fruit and the like articles, including a plurality of containers to receive articles of different sizes, the combination comprising: an endless driven conveyor extending over said containers, a gauging member carried by said conveyor, said member including a casing secured to said conveyor, said casing having a wall and slots extending through said wall, a series of elongated carriers extending slidingly through said slots, projections secured to inner ends of said carriers and forming together an upwardly flaring cage to support an article to be gauged, a ring frictionally and coaxially fitted around said casing and provided with arcuate grooves eccentric with reference to the ring, each groove engaging the outer end of a corresponding carrier, the rotation of the ring controlling simultaneously through the action of its grooves on the carriers the radial positions of said carriers and projections to define the size of the cage, a pinion fitted over said ring, said pinion having external peripheral teeth, a chain of adjustable length located at one of the containers to engage the teeth of the pinion on the gauging member carried along by the conveyor to urge said projections outwardly, and thereby to adjust the extent of opening of the cage to such a size as will allow the fruit of said size carried by the cage to drop out of the latter into said one container.

4. In a machine for gauging fruit and the like articles including a plurality of containers to receive articles of different sizes, the combination comprising: an endless driven conveyor extending over said containers, a gauging member carried by said conveyor, said member including a casing secured to said conveyor, said casing having a cylindrical wall provided with slots extending through the wall, a series of elongated carriers extending slidingly through said slots, projections secured to inner ends of said carriers and forming together an upwardly flaring cage to support an article to be gauged, a ring frictionally and coaxially fitted around said casing and provided with arcuate grooves eccentric with reference to the ring, each groove engaging the outer end of a corresponding carrier, the rotation of the ring controlling simultaneously through the action of its grooves on the carriers the radial positions of said carriers and projections to define the size of the cage, two pivotally interconnected levers, of which one lever is pivotally secured at one end to said ring, the other lever being pivotally secured at an intermediate point of its length to the casing, and stationary camming means located at one of the containers to operate said other lever of the gauging member carried along by the conveyor to urge said projections outwardly by predetermined amounts to open the cage stepwise to such a size as will allow an article to drop out of the cage into said one container.

References Cited in the file of this patent

UNITED STATES PATENTS

| | | |
|---|---|---|
| 1,184,209 | Porter | May 23, 1916 |
| 1,680,880 | Hartrampf | Aug. 4, 1928 |
| 2,637,442 | Hartrampf | May 5, 1953 |

FOREIGN PATENTS

| | | |
|---|---|---|
| 118,048 | Australia | Jan. 18, 1944 |
| 74,739 | Netherlands | May 15, 1954 |